Patented June 24, 1941

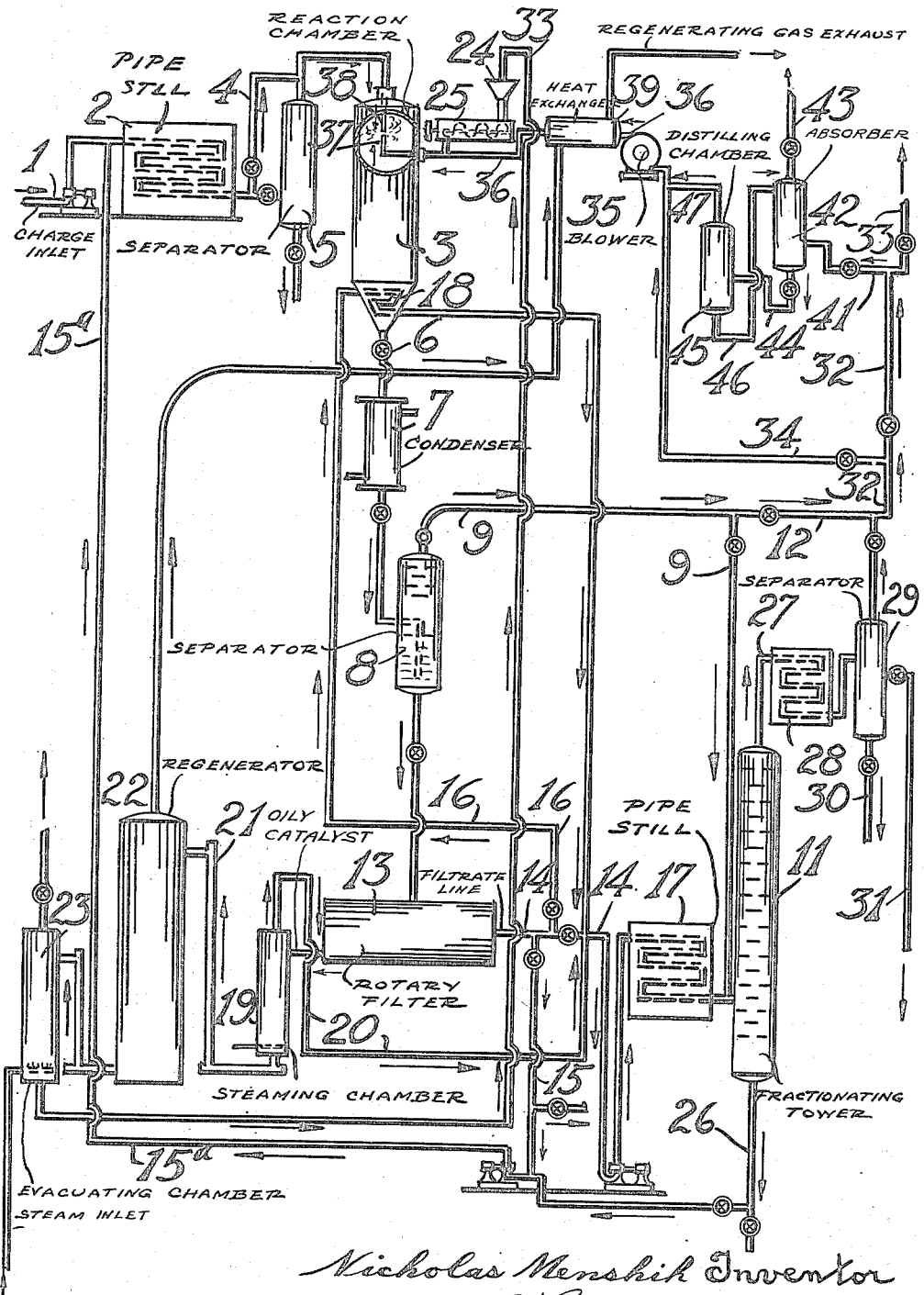

2,247,097

UNITED STATES PATENT OFFICE 2,247,097

CATALYTIC CRACKING OF HYDROCARBON OIL

Nicholas Menshih, Cranford, N. J., assignor to Standard Oil Development Company, a corporation of Delaware Application May 18, 1938, Serial No. 208,533

6 Claims. (Cl. 196—9)

The invention relates to the treatment of hydrocarbons and more particularly to the catalytic cracking of petroleum oils.

In the cracking of petroleum oils and similar substances, the reaction is catalyzed with adsorbent materials such as active or activated hydrosilicates of aluminum or other synthetic adsorbent materials. According to one of the common types of catalytic processes, heated hydrocarbon vapors are passed through a bed of such catalytic material in a suitable reaction chamber. In such process the catalytic material is preformed into pellets or pills to facilitate passage of the vapors through the catalyst bed. This necessitates sacrifice of surface area of catalyst to reduce resistance of the catalyst mass to the passage of vapors.

Moreover, the catalytic bed must be regenerated at periodic intervals which necessitates interruption of the cracking operation within the reaction chamber to regenerate the used catalyst.

It has also been proposed to use catalyst of pulverulent form, feeding the pulverized material into the stream of hydrocarbon gas before it enters the reaction chamber and later separating the catalyst from the gaseous reaction products before they are condensed and separated. The latter process, however, has not thus far enjoyed any measure of success, one reason being the mechanical difficulties involved in separating the powdered catalyst from the reaction products. Another serious difficulty encountered in prior processes of this type is the inability to obtain uniform dispersion of the powdered catalyst in the vapor stream.

More particularly, it is an object of my invention to provide an improved method of treating hydrocarbons in which the reaction is catalyzed with finely comminuted material.

Another object is to provide an improved method of catalyzing cracking and similar reactions with comminuted catalytic material wherein higher yields of gasoline are obtained with lower coke losses.

A further object of the invention is to provide a method of the character described in which the mixture of reaction products and catalytic material can be separated in the liquid phase.

A further object is to provide a method of this character in which non-condensible gases from the fractionating unit and separators can be utilized as carriers for the introduction of fresh or regenerated catalyst into the reaction zone in the form of a gaseous suspension.

Other objects and advantages will appear as the description proceeds.

The process will now be described with reference to the accompanying drawing which illustrates diagrammatically one arrangement of apparatus adapted to the practice of the method as applied to the cracking of petroleum oils. The drawing is a diagram of one arrangement of apparatus for carrying my invention into effect.

In accordance with the preferred practice of my invention, the oil to be cracked is fed through a line 1 into a heating zone, which may consist of a conventional pipe still 2, where it is vaporized and the vapors brought to a suitable temperature for delivery to the reaction chamber 3 which the vapors enter through the line 4.

The oil to be cracked may be a clean condensate stock of cracked or virgin character or a heavier residual stock such as reduced crude. When processing heavier oils a separator 5 may be provided between the pipe still 2 and the reaction chamber 3 to remove unvaporized constituents from the oil prior to introduction into the reaction zone.

As the hydrocarbon vapors enter the reaction chamber, they are caused to impinge against a jet of finely comminuted catalyst suspended in a gaseous medium. I prefer to employ a comminuted catalyst which will pass a screen of 200 to 300 mesh. The catalyst suspended in the gaseous medium may be preheated to any desired temperature before being introduced into the reaction chamber. Additional heat may be supplied directly to the reaction chamber if so desired.

The oil vapors by direct impingement of the powdered catalyst stream is instantly diffused. Throughout the oil vapors, intimate contact between the vapors and catalyst is accomplished. Due to the finely divided condition of the catalyst the desired degree of cracking may be accomplished at relatively short contact periods. Such contact periods may for example be from a fraction of a second to ten or more minutes.

The reaction products after being subjected to the desired degree of cracking within the reaction chamber in admixture with the powdered catalyst are withdrawn from the reaction chamber 3 through line 6 to a condenser 7 wherein sufficient oil is condensed to form a slurry of oil and clay suitable for passing through a rotary filter. The temperature of the products passing through the condenser 7 may be reduced to 400° F. to condense constituents boiling above the desired boiling range of the gasoline or it may be reduced to a lower temperature to condense a part or all of the gasoline constituents.

In lieu of condenser 7, the products may be quenched by directly introducing a cooling oil into the vapor products. Such cooling oil may, for example, be a relatively heavy gas oil. In such case, the products need not be reduced to as low a temperature as to provide sufficient liquid to form the slurry since the oil introduced will provide additional liquid for forming the slurry.

The products from condenser 7 pass to a separator 8 where uncondensed vapors separate from oil-catalyst residue. Vapors pass overhead from separator 8 through line 9 communicating with a fractionating tower 11 wherein the vapors are subjected to fractionation to condense insufficiently cracked constituents.

In cases where the total gasoline fraction is condensed within the condenser 7, the overhead from separator 8 may by-pass the fractionating tower 11 through line 12 and merge with non-condensable gases obtained indirectly from the fractionating tower in a manner hereinafter more fully explained.

The slurry from the separator 8 passes to a conventional filter 13 for separation of the oil from the catalyst. As shown, the filter is of conventional rotary type having the filter cloth mounted on a rotating segmental drum and constructed in such manner that during each rotation of the drum the products are filtered, dried, and discharged. The construction of such filters is well known and need not be described in detail.

The filtrate separated in the filter 13 is withdrawn therefrom through line 14 and may be discharged from the system through line 15, or recycled to the inlet side of the heating furnace 2.

According to one of the more specific phases of my invention, in which substantial amounts of gasoline constituents are condensed in condenser 7, it is desirable to distill such filtrate to liberate the gasoline constituents. To this end, the filtrate may be continued through line 14 to a conventional pipe still 17 wherein the filtrate is heated to a temperature sufficient to vaporize the gasoline constituents. If desired, a part of the heat for accomplishing the distillation may be obtained by passing the filtrate through line 16 to a heat exchange coil 18 in heat exchanging relation with cracked products in the bottom of the reactor 3.

The catalytic material separated by the filter 13 is carried by a screw conveyor or other suitable means to steaming or evacuating apparatus illustrated schematically at 19 where the adsorbed hydrocarbons are driven off.

The steaming or purging apparatus for removing the absorbed oil from the surface of the catalyst may take a wide variety of forms, and consequently is illustrated in the drawing only symbolically. Any suitable apparatus capable of accomplishing intimate contact between the steam and the powdered catalyst may be employed, for example, this contact may be obtained in an apparatus similar to the reactor 3 in which the steam is caused to impinge directly against the catalyst. As a further example, the catalyst may be suspended in a stream of steam, or it may be passed downwardly through a chamber counter-current to the passage of steam.

The mixture of steam and oil formed in the steaming chamber 19 is withdrawn through line 20 and passed to the inlet side of the heating coil 17. The powdered catalyst, after removal of the oil therefrom, is removed from the steaming apparatus 19 and transferred by means of a suitable transfer mechanism such as, for example, a bucket or screw conveyor indicated symbolically by line 21 to a regenerating apparatus indicated schematically as unit 22 wherein the carbonaceous deposits formed on the surface of the cracking operation are oxidized and removed from the catalyst.

The regenerating equipment may, likewise, assume various forms, and for that reason does not show in detail on the patent drawing. Any suitable apparatus capable of effecting careful temperature control of a catalyst mass during the oxidation treatment may be employed. One type of apparatus suitable for accomplishing the regeneration may, for example, be the regenerating equipment described in the Manning Patent 1,475,502 in which the catalyst to be regenerated is suspended in the oxidizing medium, and the temperature during regeneration controlled by the concentration of the oxygen and recirculation of combustion gases to the regenerating furnace.

Other types of apparatus such as rotary kiln, the Herrschoff type furnace, etc., in which the catalyst is passed over a plurality of vertically spaced hearths by means of rabble arms, may also be employed. The regenerated catalyst is withdrawn from the regenerating equipment 22 by means of a screw conveyor, or other suitable transfer mechanism, and passed to a steaming or evacuating chamber 23 for removing regenerating gases from the catalyst. This steaming or evacuating chamber 23 may be of similar or different design than the chamber 19 employed for removing the oil vapors from the unregenerated catalyst. The catalyst from the steaming chamber 23 is then transferred to a storage bin or hopper 24 from whence it is passed by means of screw conveyor 25 into a gaseous hydrocarbon stream and introduced into the reaction chamber 3 in the manner previously described. The gas employed as a carrier for the catalyst may, for example, be residual gases from the cracking operation recovered indirectly from the fractionating tower 11 as hereinafter described.

Vapor products introduced into the fractionating tower 11 obtained either directly as overhead from the separator 8, or as products from the pipe still 17, or both, are subjected to fractionation in the fractionating tower to condense insufficiently cracked constituents as reflux condensate. This condensate may be withdrawn from the fractionating tower 11 through line 26. The reflux condensate so withdrawn may be removed from the system, or a part, or all, recycled to the pipe still 2 for further cracking.

Products remaining uncondensed in the fractionating tower 11 pass overhead through line 27 to a condenser 28, wherein gasoline constituents and steam present in the vapors are condensed. Products from the condenser 28 pass into a separator 29 in which uncondensed gases separate from the liquid. The water formed by condensing the steam is withdrawn from the bottom of the separator 29 through line 30 and the gasoline is withdrawn from the upper section of the separator 29 through line 31. The gasoline so withdrawn may be subjected to any further purifying or stabilizing treatment as desired.

The gases separated in the separator 29 are removed overhead through line 32 and may be vented from the system through line 33.

However, according to one of the important phases of my invention, a part, or all, of the residual gases separated in the separator 29 are employed as a medium for suspending the catalyst, being introduced into the reaction chamber 3. To this end, gases from the line 32 are passed through line 34 to a fan or compressor 35, designed to impart a high velocity to the gases passed thereto. From the fan 35 the residual gases are forced through line 36 into the reaction chamber 3. The line 36 extends into the interior of the reaction chamber 3 and terminates in an upwardly projecting nozzle 37 adapted to impinge upon the fresh oil vapors introduced into the reaction chamber 3 through line 38. The gases forced into the reaction chamber 3 through line 36 may, if desired, be initially heated by passing through a heat exchanger 39 positioned in line 35. The heat for preheating such gases may be obtained by passing the hot regenerated gases from the regenerating unit 22 in indirect heat exchange relation with the gases in line 36. The catalyst is introduced into the line 36 by means of a screw conveyor 25 and is carried by means of the gases into the reaction chamber 3. The catalyst introduced into the line 36 comprises the regenerated catalyst from the steaming chamber 23, together with any additional fresh catalyst necessary to make up for catalyst loss.

As just described, the residual gases employed as a carrier for the catalyst, being introduced into the reaction chamber 3, comprise an aliquot portion, or all of the residual gases separated in separator 29. According to another phase of my invention, the residual gases from the separator 29 may be first treated to remove hydrogen and methane therefrom before being returned to the cracking system. To this end, the residual gases from the separator 29 may be passed through lines 32 and 41 to a hydrogen-methane separator 42. As shown, the hydrogen-methane separator 42 is of the absorber type in which the gases initially pass a counter-current contact with a suitable absorber oil such as gas oil capable of selectively dissolving the higher boiling hydrocarbon such as ethane, propane, butane, and the like from the gases. The unabsorbed gases, consisting principally of methane and hydrogen, pass overhead through line 43 and are vented from the system. The absorber oil enriched with dissolved gaseous hydrocarbons is withdrawn from the bottom of the absorber 42 through line 44 and passed to a distilling chamber 45 wherein the gaseous hydrocarbons so absorbed are vaporized and liberated from the absorber oil. The lean absorber oil from the distilling tower 45 is withdrawn through line 46 and re-circulated to the top of the absorber tower 42. The liberated gaseous hydrocarbons pass overhead from the distilling chamber 45 through line 47 to the compressor 35 for re-circulation to the cracking system.

The manner of discharging the catalyst suspended in the gaseous hydrocarbon stream into the reaction chamber is subject to variation. The suspension may simply be discharged through a pipe or orifice 37 as indicated in the diagram, or, if it is desired to create a wider zone of contact, it may be injected through a revolving spreader. Nozzles and spreaders adaptable to this purpose are old and well known and form no part of the present invention.

The hydrocarbon feed vapors and the catalytic suspension should be heated to temperatures in the neighborhood of 800–900° F. before entering the reaction chamber. These temperatures, however, are subject to considerable variation depending upon the character of oil cracked, the amount of heat which is to be supplied from other sources, and upon other variants as will be fully appreciated by those skilled in the art of cracking of petroleum oils. The cracking reaction is performed between 750–950° F. and preferably at a temperature close to 850° F. The proper time of contact for any given installation may be determined by simple experiment and can be adjusted for intervals varying from 1 to 60 seconds or more. I do not desire to be limited, however, to any particular time of contact between the catalytic suspension and the feed gas.

The following are some of the more important features of my invention which it is desired to particularly emphasize. It should be understood, however, that the invention in its broader aspects is not restricted to these specific phases of the invention, but in its entirety comprehends such combinations of steps and subcombinations of steps which go to make up the complete operating process.

One of the more important phases of the invention is the diffusion of the catalyst in powdered form into the oil vapor stream by direct impingement of a stream of catalyst against the stream of oil to be cracked. By this method of diffusion, rapid and intimate contact between the oil vapors and the catalyst can be effected. Moreover, by suspending or diffusing the catalyst into the vapors to be cracked, the time of contact of the oil vapors with the catalyst between regenerations can be limited to very short periods of time. The process, therefore, permits carrying out the operation under conditions of high temperature and extremely short contact times.

Another of the more important phases of the invention is the cooling of the reaction products to condense a portion thereof prior to any attempt to separate the catalyst from the reaction products. By condensing a substantial amount of the reaction products, sufficient to form an oil catalyst slurry, the provision of cumbersome apparatus necessary to separate finely divided solids from vapors, is avoided.

Another important phase of my invention is the utilization of residual gases, with or without first separating hydrogen and methane therefrom, as a carrier for introducing the finely divided catalyst into the reaction chamber. These residual gases not only serve as a carrier for the catalyst, but also undergo additional polymerizing and alkylating reactions within the reaction zone, thus materially improving the over-all yield of gasoline produced.

The terms and expressions which I have employed are used as terms of description and not of limitation, and I have no intention of excluding such equivalents of the invention set forth, or of portions thereof, as fall within the purview of the claims.

I claim:

1. A method of catalytically cracking hydrocarbon oils which comprises heating the oil to cracking temperatures and vaporizing it, passing the oil so vaporized in a restricted stream into a cracking zone, impinging against the stream so introduced a pulverized siliceous catalyst to thereby disperse said catalyst therein causing concurrent flow of vapors and catalyst, maintaining the dispersion of catalyst and oil vapors within the cracking zone for a period sufficient to obtain the desired treatment thereof and thereafter separating the pulverized catalyst from the treated products.

2. A method of catalytically cracking hydrocarbon oils which comprises vaporizing the oil to be cracked, dispersing a pulverized siliceous catalyst in a normally gaseous stream thereafter intimately contacting the oil vapors to be cracked with the dispersion of catalyst and gas to obtain intimate admixture of catalyst and oil vapor, maintaining the admixture at cracking temperature for a period adequate to effect the desired cracking of said oil vapors, thereafter separating the catalyst from the cracked products.

3. In the method defined in claim 2 the further improvement which comprises separately introducing the oil vapors and gaseous dispersion of catalyst into an enlarged reaction zone and intimately admixing the oil vapors and dispersion therein.

4. In the method defined in claim 2 the further improvement which comprises impinging a stream of said hydrocarbon vapors against a stream of gases containing said catalyst to obtain intimate admixture thereof.

5. In a catalytic cracking process wherein the oil to be cracked is passed through a cracking zone in admixture with a pulverized siliceous catalyst suspended therein, the catalyst thereafter separated from the cracked products and the cracked products fractionated to separate a motor fuel fraction and a normally gaseous fraction; the improvement which comprises further separating said normally gaseous fraction into a light fraction and a heavier fraction, and returning said heavier fraction to the cracking zone after suspending pulverized cracking catalyst in it.

6. In a catalytic cracking process wherein the oil to be cracked is passed through a cracking zone in admixture with a pulverized siliceous catalyst suspended therein, the catalyst thereafter separated from the cracked products and the cracked products fractionated to separate a motor fuel fraction and a normally gaseous fraction; the improvement which comprises passing the oil vapors to be cracked in a restricted stream into an enlarged reaction zone, further separating said normally gaseous fraction into a light fraction and a heavier fraction, suspending the pulverized cracking catalyst in the heavier fraction and impinging the suspension of pulverized catalyst and gaseous carrier against the stream of hydrocarbon vapors introduced into the cracking zone.

NICHOLAS MENSHIH.